UNITED STATES PATENT OFFICE.

EGIL LIE, OF ODDA, NORWAY.

PRODUCING UREA FROM CYANAMIDE.

1,419,157.   Specification of Letters Patent.   Patented June 13, 1922.

No Drawing.   Application filed June 10, 1920. Serial No. 388,031.

*To all whom it may concern:*

Be it known that I, EGIL LIE, citizen of Norway, residing at Odda, Norway, have invented certain new and useful Improvements in the Producing of Urea from Cyanamide (for which I have made application in Norway May 7, 1919), of which the following is a specification.

Urea is, as is well known, a very valuable fertilizing agent and various methods have been proposed to produce the same.

As a starting material for the manufacture of urea, commercial calcium cyanamide has been usually used, and it has been proposed to submit this material to a treatment with acids or acid salts. The employment of acids is however expensive and when acid salts are used it is necessary to employ excessively great amounts thereof, which is a drawback because the content of nitrogen in the product becomes lower than desirable.

The conversion of the cyanamide into urea is commonly supposed to be due to the hydrogen ions of the acids or acid salts.

When heating calcium cyanamide alone (to which the amount of water is added, which is necessary for the formation of urea) and which therefore will contain $Ca(OH)_2$, it is thus only possible to obtain an inconsiderable formation of urea, as the cyanamide is chiefly converted into di-cyan-diamide or ammonia, according to the temperature used.

When treating commercial calcium cyanamide (known in the trade as "lime nitrogen") with neutral or basic salts in the presence of water it might therefore be supposed that the cyanamide, owing to the presence of water, would chiefly be converted into di-cyan-diamide or ammonia.

According to the present invention, however, the astonishing observation has been made, that cyanamides when employing the water-soluble salts of the alkalies or the alkaline earths, under certain conditions may be converted (wholly or partly) into urea. The invention does not, however, include the aforesaid acid salts with which, as mentioned, the formation of urea is caused by hydrogen ions.

The extent to which the formation of urea takes place is dependent upon the temperature, the amount of water, the proportion or ratio of mixture between the cyanamide and the salt in question, the pressure and upon the time of reaction. Also the formation of urea is different for the different salts, the conversion taking place slower or faster, whereas also the amount of other conversion products, such as ammonia and di-cyan-diamide which will be formed may vary. By choosing the most favorable conditions, the inventor has, however, succeeded in transforming the major part of the cyanamide nitrogen into urea.

The non-acid salts of the alkali metals and of the alkaline earth metals which are soluble in water and especially the normal nitrates or basic nitrates (non-acid salts), are especially suitable in the process.

When using $Ca(NO_3)_2$ it has been found that the rising temperature will further the formation of urea. At 40–50° C. and even when employing a sufficient excess of water, the formation of urea is proportionally inconsiderable and takes place very slowly. Even after a time of reaction of 24 hours considerable amounts of cyanamide are undecomposed. At an increasing temperature the time of reaction is shortened at the same time as the formation of urea increases, and at 80–100° C. the predominant part of the nitrogen may be obtained as urea in the course of a very short time, whereas the loss of nitrogen in the form of ammonia is insignificant.

At temperatures above 100° C. the conditions for the formation become favorable. Thus, when heating 6 hours at 110° C. and using 100 parts of cyanamide+120 parts of commercial $Ca(NO_3)_2$+77 parts of water, half of the nitrogen is driven off as ammonia, whereas only a fifth was found to be converted into urea. The rest consisted chiefly of cyanamide and di-cyan-diamide.

At still higher temperatures, the formation of ammonia will increase further.

If it is therefore wanted to use temperatures above 100° C. for the formation of urea, special measures must be taken to avoid an essential loss of ammonia, and good results are obtained by adjusting the time of reaction and the admixture of water according to the temperature selected. By heating to 125–130° C. and using 100 parts of cyanamide+100 parts of commercial $Ca(NO_3)_2$+20 parts of water, about 83 per cent of the converted cyanamide were transformed into urea before the end of 60 minutes. At the same time the loss of ammonia was insignificant.

The production of ammonia from cyanamide by treatment with aqueous salt solutions, such as calcium nitrate, is already known; but according to the above-mentioned, this is not the object of the present invention, as the formation of ammonia has to be reduced as much as possible in order that the highest possible amount of urea may be obtained.

Also it is known to mix the cyanamide with substances which absorb water easily, such as calcium nitrate, in order to produce a non-dusting product, namely, a fertilizer mixture. In these methods, however, measures are taken to prevent chemical reactions from taking place between the components, the mixtures being subjected to cooling, whereby a formation of urea of course is precluded.

According to the present invention it is further important that sufficient water is at hand for a complete conversion into urea. Theoretically, about 46 parts of water to 100 parts of commercial calcium cyanamide will be necessary for a complete formation of urea, but owing to evaporation, an excess of water should be used over this amount.

The necessary water may be in the form of the water of crystallization of the salt in question itself, but usually still more favorable results are obtained by a further admixture of water.

Thus, by the employment of calcium nitrate, it would be necessary in order to obtain a complete decomposition into urea, to use great amounts of calcium nitrate in proportion to cyanamide, which would be wasteful. Besides the decomposition into urea would take place at a slower rate.

According to the present method, the process, if calcium nitrate is used, is suitably carried out as follows: 100 parts calcium nitrate, which are dissolved in 20-80 parts of water, are added to 100 parts of commercial calcium cyanamide, whereupon the mixture is subjected to the aforesaid conditions of reaction.

According to the invention the water which is necessary for the process may be added to the mixture of cyanamide and the salts in question, or the salts may be dissolved in water or mixed therewith beforehand. Also the cyanamide may beforehand be dissolved in water or have water mixed with it.

In connection with the formerly known methods it is supposed that the salt to be used must be water-absorbing or contain water and that it must melt easily at a low temperature, for which reason the salt in melted state was mixed with cyanamide. According to the present invention this condition is quite unnecessary, because it only is necessary that the salt in question is somewhat soluble in water. It is not necessary to use so much water as to dissolve the salt.

Instead of water it may often prove profitable to employ water vapors partly or exclusively.

The exertion of pressure will act to accelerate the formation of urea. A fast and complete formation of urea is further obtained if the free lime of the cyanamide is beforehand partly or entirely neutralized by acids or acid anhydrids as $SO_2$, $CO_2$, etc.

The process may further be carried out with the aid of catalysts.

The temperatures most suitable for carrying out the process will depend upon the particular salt used, and on other conditions, such as the amount of water, the use of pressures above atmospheric, etc.

With calcium nitrate the most favorable temperatures lie between about 80° C. and about 150° C. With salts generally of the class above referred to, the most favorable temperatures lie between 70° C. and 160° C.

According to this process one can, in a hitherto unknown manner, and in a very simple and technical easily - practicable method, convert the essential part of the nitrogen of the cyanamide into the form of a very valuable fertilizer product. A further advantage is this, that a product may be obtained directly which contains practically all the nitrogen in a stable form, whereby such complications are avoided which would arise if the nitrogen were decomposed to ammonia, after which this would have to be combined with acids and a new product produced.

Further the product is obtained in a dry form which by means of known methods of working may be brought into the shape and the grain-size, which is desired.

Also it must be regarded as a great advantage to the industry that inexpensive and easily-obtainable substances may be used. The material can be mixed with other fertilizers which contain nitrogen, potash, or phosphoric acid, whereby valuable mixed fertilizers are produced.

I claim:

1. A method for the conversion of cyanamide material into urea, which comprises treating the cyanamide in the presence of water in excess of the amount sufficient to react with all unslaked lime in the cyanamide used and the amount theoretically necessary to react with all of the cyanamide present, with the formation of urea with a non-acid salt of an alkali-forming metal, at a temperature above 70° C., and high enough to cause a large part of the cyanamide to be converted into urea, but below that at which most of the urea formed would be converted into ammonia.

2. A method for the conversion of cyanamide material into urea, which comprises treating the cyanamide in the presence of water in excess of the amount sufficient to react with all unslaked lime in the cyanamide used and the amount theoretically necessary to react with all of the cyanamide present, with the formation of urea with a nitrate of an alkali-forming metal, at a temperature above 70° C., and high enough to cause a large part of the cyanamide to be converted into urea, but below that at which most of the urea formed would be converted into ammonia.

3. A method for the conversion of cyanamide material into urea, which comprises treating the cyanamide in the presence of water with a non-acid salt of an alkali-forming metal, at a temperature above 80° C., but below that at which most of the urea formed would be converted into ammonia.

4. In the production of urea by treating cyanamide with water in the presence of a salt acting to aid the transformation of nitrogen from the form of cyanamide into the form of urea, under the action of heat, the herein described improvement which comprises the addition of a non-acid salt as the salt to aid the said transformation of cyanamide into urea and conducting the said transformation between 80° C. and 160° C.

5. In the production of urea by treating cyanamide with water in the presence of a salt acting to aid the transformation of nitrogen from the form of cyanamide into the form of urea, under the action of heat, the herein described improvement which comprises the addition of calcium nitrate as the salt to aid the said transformation of cyanamide into urea and conducting the said transformation between 80° C. and 160° C.

6. A method for the conversion of cyanamide material into urea, which comprises treating cyanamide in the presence of water, with a soluble non-acid salt of an alkali-forming metal, at a temperature above 80° C. but below that at which most of the urea formed would be converted into ammonia.

7. A method for the conversion of cyanamide material into urea, which comprises treating cyanamide in the presence of water, with a nitrate of an alkali-forming metal, at a temperature not below 80° C., but below that at which most of the urea formed would be converted into ammonia.

8. A process for the conversion of cyanamide material into urea, which comprises treating cyanamide in the presence of water, with calcium nitrate, at a temperature not below 80° C., but below that at which most of the urea formed would be converted into ammonia.

In testimony whereof I affix my signature.

EGIL LIE.